US008140081B2

(12) United States Patent
Barrett et al.

(10) Patent No.: US 8,140,081 B2
(45) Date of Patent: Mar. 20, 2012

(54) CODE DIVISION MULTIPLE ACCESS CELLULAR COMMUNICATION SYSTEM

(75) Inventors: Stephen J. Barrett, Curridge (GB); Gerald T. Foster, Marston Meysey (GB); David C. Padfield, Marlborough (GB)

(73) Assignee: Motorola Mobility, Inc., Libertyville, IL (US)

( * ) Notice: Subject to any disclaimer, the term of this patent is extended or adjusted under 35 U.S.C. 154(b) by 441 days.

(21) Appl. No.: 12/520,883

(22) PCT Filed: Nov. 5, 2007

(86) PCT No.: PCT/US2007/083609
§ 371 (c)(1), (2), (4) Date: Jun. 23, 2009

(87) PCT Pub. No.: WO2008/094333
PCT Pub. Date: Aug. 7, 2008

(65) Prior Publication Data
US 2010/0093351 A1   Apr. 15, 2010

(30) Foreign Application Priority Data
Jan. 30, 2007  (GB) .................................. 0701730.4

(51) Int. Cl.
*H04W 36/00* (2009.01)
(52) U.S. Cl. ......... 455/444; 455/436; 455/442; 370/331
(58) Field of Classification Search .................. 455/436, 455/437, 438, 440, 442, 443, 444; 370/331–334
See application file for complete search history.

(56) References Cited

U.S. PATENT DOCUMENTS

| | | | | |
|---|---|---|---|---|
| 6,438,120 B1 * | 8/2002 | Gustavsson et al. | .......... | 370/335 |
| 6,845,238 B1 * | 1/2005 | Muller | .......... | 455/436 |
| 6,985,731 B1 * | 1/2006 | Johnson et al. | .......... | 455/436 |
| 7,301,922 B1 * | 11/2007 | Bhalla et al. | .......... | 370/331 |
| 7,408,901 B1 * | 8/2008 | Narayanabhatla | .......... | 370/331 |
| 7,693,172 B2 * | 4/2010 | An et al. | .......... | 370/441 |
| 7,813,746 B2 * | 10/2010 | Rajkotia | .......... | 455/515 |
| 8,032,168 B2 * | 10/2011 | Ikaheimo | .......... | 455/515 |
| 2003/0039228 A1 | 2/2003 | Shiu et al. | | |
| 2005/0047492 A1 | 3/2005 | Amerga et al. | | |
| 2007/0002796 A1 | 1/2007 | Horn et al. | | |
| 2007/0049280 A1 * | 3/2007 | Sambhwani et al. | .......... | 455/442 |
| 2008/0101301 A1 * | 5/2008 | Thomas et al. | .......... | 370/335 |
| 2009/0069013 A1 * | 3/2009 | Thomas et al. | .......... | 455/436 |

FOREIGN PATENT DOCUMENTS

GB  2359698 A  8/2001
GB  2427788 A  1/2007

* cited by examiner

*Primary Examiner* — Kent Chang
*Assistant Examiner* — Magdi Elhag

(57) ABSTRACT

A base station (101) supports a remote station (117) making uplink transmissions using an uplink scrambling code in a first cell. A controller (119) determines a set of uplink scrambling codes from an identity of the remote station (117) and selects the used code therefrom. An access point (111) determines the group of remote stations registered at the access point. A measurement code processor (205) determines the uplink scrambling codes potentially used by the remote stations. A measurement unit (207, 209) then monitors for received signals using these codes and a handover detection processor (211) generates a potential handover detection for the remote station (117) in response to a detection of a received signal using the uplink scrambling code of the remote station (117).

17 Claims, 3 Drawing Sheets

CODE DIVISION MULTIPLE ACCESS CELLULAR COMMUNICATION SYSTEM

FIELD OF THE INVENTION

The invention relates to a Code Division Multiple Access (CDMA) cellular communication system and in particular, but not exclusively to a Universal Mobile Telecommunication System (UMTS).

BACKGROUND OF THE INVENTION

A method which has been used to increase the capacity of cellular communication systems is the concept of hierarchical cells wherein a macro-cell layer is underlayed by a layer of typically smaller cells having coverage areas within the coverage area of the macro-cell. In this way, smaller cells, known as micro-cells or pico-cells (or even femto-cells), are located within larger macro-cells. The micro-cells and pico-cells have much smaller coverage thereby allowing a much closer reuse of resources. Frequently, the macro-cells are used to provide coverage over a large area, and micro-cells and pico-cells are used to provide additional capacity in e.g. densely populated areas and hotspots. Furthermore, pico-cells can also be used to provide coverage in specific locations such as within a residential home or office.

In order to efficiently exploit the additional resource, it is important that handover performance between the macro-cell layer and the underlying layer is optimized. The process of handover can be separated into three phases. Firstly, identifying that a handover might be required, secondly, identifying a suitable handover candidate and finally, switching the mobile user from one base station to another.

The current trend is towards introducing a large number of pico-cells to 3G systems. For example, it is envisaged that residential access points may be deployed having a target coverage area of only a single residential dwelling or house. A widespread introduction of such systems would result in a very large number of small underlay cells within a single macro-cell.

However, underlaying a macro-layer of a 3G network with a pico-cell (or micro-cell) layer creates several issues. For example, the introduction of a large number of underlay cells creates a number of issues related to the identification of individual underlay cells when e.g. handing over to an underlay cell. In particular, 3G communication systems are developed based on each cell having a relatively low number of neighbours and extending the current approach to scenarios wherein the mobile station may need to consider large numbers of potential neighbour cells is not practical.

One problem of extending current approaches to scenarios where there are many underlaying pico-cells is how to detect that a handover is needed and uniquely and efficiently identify the target pico-cell (or microcell). Specifically, it is not practically feasible to assign individual pilot signal scrambling codes to each underlay cell and to identify all potential handover underlay cells as neighbours of the macro-cell as this would require very large neighbour lists. These large neighbour lists would e.g. result in the neighbour list exceeding the maximum allowable number of neighbours in the list, slow mobile station measurement performance as a large number of measurements would need to be made, increased resource usage etc. It would furthermore require significant operations and management resource in order to configure each macro-cell with the large number of neighbours and would complicate network management, planning and optimisation.

However, sharing scrambling codes for the pilot signals of the pico-cells results in a target ambiguity and prevents the mobile station from uniquely identifying a potential handover target. For example, if a group of base stations supporting different underlay cells underlaying a given macro-cell use an identical shared pilot signal scrambling code, a mobile station detecting the presence of this shared scrambling code will be aware that a potential handover target has been detected but will not be able to uniquely identify which of the group of underlay cells has been detected.

Furthermore, a system wherein each underlay cell transmits a pilot signal to support handovers generates a large amount of interference which may significantly degrade the performance of the system. In particular, sharing scrambling codes tend to result in the pilot signals from different underlay cells interfering with each other. Furthermore, in scenarios where remote stations are only allowed to use some underlay cells, a large number of handover attempts to underlay cells which the remote station is not allowed to use may occur. These handover attempts will be rejected but will result in a significant resource usage.

Hence, an improved cellular communication system would be advantageous and in particular a system allowing increased flexibility, improved suitability for large numbers of potential handover targets/neighbour cells, improved suitability for overlay/underlay handovers, reduced neighbour lists, reduced handover attempts, reduced interference, reduced signalling, reduced resource overhead, increased practicality, reduced measurement requirements, facilitated and/or improved handover target detection/identification and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a Code Division Multiple Access, CDMA, cellular communication system comprising: a first base station supporting a remote station making uplink transmissions using an uplink scrambling code in a first cell; scrambling code means arranged to determine a first set of uplink scrambling codes from an identity for the first remote station and to select the uplink scrambling code from the first set; the first set having a unique dependency from the identity; a first access point supporting a second cell and comprising: means for determining a group of remote stations registered at the access point, the group of remote stations comprising the first remote station; means for determining associated uplink scrambling codes for the group of remote stations, a first associated uplink scrambling code of the first remote station being a scrambling code of the first set of uplink scrambling codes; means for monitoring for received signals using the associated uplink scrambling codes; and handover detection means arranged to generate a potential handover detection for a handover of the first remote station from the first cell to the second cell in response to a detection of a received signal using the first associated uplink scrambling code.

The invention may allow improved and/or facilitated operation in a cellular communication system. In particular, the invention may provide improved handover detection, may enable or facilitate sharing of pilot signal scrambling codes and/or may reduce interference.

In particular, the invention may provide improved handover performance in scenarios where a few remote stations are registered with individual access points such that only these remote stations can be served by the access point. The invention may specifically, in some such scenarios, reduce the number of handover attempts to an access point to substantially only those from remote stations registered with the access point. The group of remote stations may specifically be a group of remote stations (pre)registered with the access point. The registered group of remote stations may consist in all remote stations which are allowed to be supported by the access point.

The invention may in particular allow an efficient resolution of a handover target from a plurality of possible handover targets using the same shared pilot signal scrambling code.

The group of remote stations may comprise one or more remote stations. The first set of uplink scrambling codes may comprise one or more uplink scrambling codes. In some examples, the first set of uplink scrambling codes comprise only one uplink scrambling code which is uniquely linked to the identity of the first remote station.

The identity of the first remote station may be a permanent or temporary identity and may e.g. be a subscriber or terminal identity such as an International Mobile Subscriber Identity (IMSI).

According to an optional feature of the invention, the access point further comprises: handover means for temporarily transmitting a handover pilot signal using a handover pilot signal scrambling code in response to the potential handover detection, the pilot signal scrambling code being comprised in a neighbour list for the remote station.

This may allow improved handover operation. Specifically, it may reduce interference and/or facilitate handover target resolution. The handover means may initiate transmission of the handover pilot signal when a potential handover detection is identified and may end the transmission after a predetermined time interval or when a specific condition/criterion is met. The feature may allow improved handover operation while providing a high degree of backwards compatibility with no necessity for modifying the remote stations and/or many existing network elements.

According to an optional feature of the invention, the CDMA cellular communication system further comprises handover initialisation means for generating a handover initialisation message in response to the potential handover detection; and means for communicating the handover initialisation message to a radio network controller supporting the first base station via a fixed network.

This may allow improved handover operation. Specifically, it may reduce interference and/or facilitate handover target resolution. The fixed network may specifically consist in a core network and radio access networks (e.g. for a $3^{rd}$ Generation cellular communication system the fixed network may be made up of the Core Network (CN) and one or more Radio Access Networks (RANs).

According to another feature of the invention, there is provided a method of operation for a Code Division Multiple Access, CDMA, cellular communication system including a first base station supporting a remote station making uplink transmissions using an uplink scrambling code in a first cell; the method comprising: determining a first set of uplink scrambling codes from an identity for the first remote station; selecting the uplink scrambling code from the first set; the first set having a unique dependency from the identity; and a first access point supporting a second cell performing the steps of: determining a group of remote stations registered at the access point, the group of remote stations comprising the first remote station; determining associated uplink scrambling codes for the group of remote stations, a first associated uplink scrambling code of the first remote station being a scrambling code of the first set of uplink scrambling codes; monitoring for received signals using the associated uplink scrambling codes; and generating a potential handover detection for a handover of the first remote station from the first cell to the second cell in response to a detection of a received signal using the first associated uplink scrambling code.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a $3^{rd}$ Generation CDMA (Code Division Multiple Access) cellular communication system such as a Universal Mobile Telecommunications System (UMTS). However, it will be appreciated that the invention is not limited to this application but may be applied to many other cellular communication systems. Also, the description will focus on scenarios where a remote station is handing over from a macro-cell to an underlay cell such as a micro-cell or a pico-cell. However, it will be appreciated that the described principles apply equally to other scenarios including e.g. some scenarios where a handover is made to a macro-cell out of a group of macro-cells using a shared pilot signal scrambling code.

Figure 1:
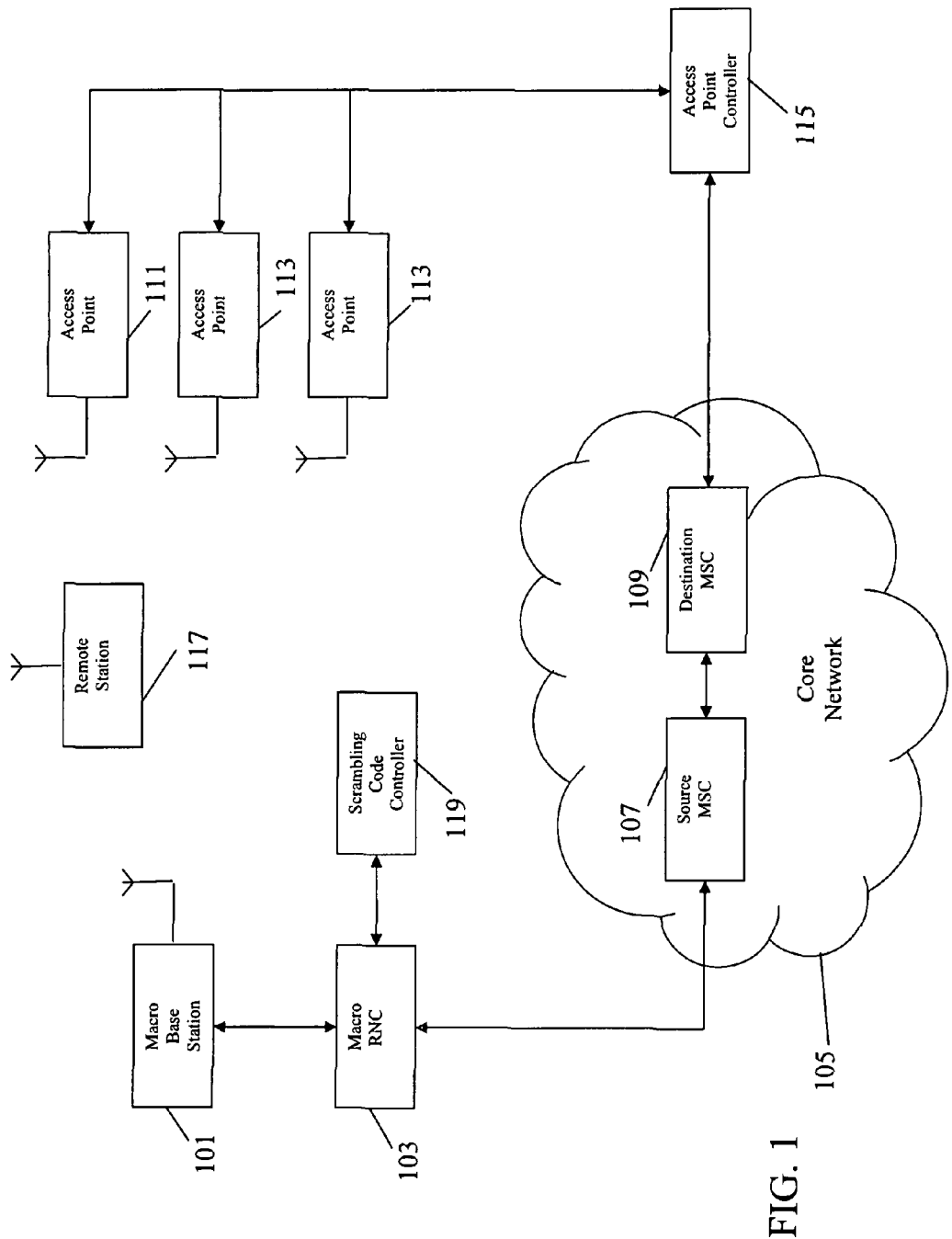
FIG. 1 illustrates an example of a cellular communication system in accordance with some embodiments of the invention.

FIG. 1 illustrates an example of a cellular communication system which in the specific example is a UMTS cellular communication system. In the system, a macro-layer is formed by macro-cells supported by base stations. Furthermore, an underlay layer of pico-cells is supported by a large number of small base stations which henceforth will be referred to as access points. Specifically, each access point may have an intended coverage of a single house or dwelling, and for a typical macro-cell coverage area of 10 to 30 km there may be hundreds or even thousands of pico-cells each supported by an individual access point.

In the system, the macro base stations each have a cell separation code in the form of a scrambling code that is unique within a given region which e.g. may be a reuse area for the cell scrambling codes. Specifically the macro base stations have an assigned scrambling code which is unique within the reuse area such that a set of defined neighbours for each cell always have unique cell scrambling codes. Furthermore, each macro-cell base station has a unique hierarchical network address given by a unique base station ID for a given serving RNC, which itself has a unique RNC ID for a given MSC. Furthermore, each MSC has a unique identity in the network.

Accordingly, the neighbour lists transmitted by the base stations comprise indications of macro-cells which all have different cell scrambling codes. Furthermore, for each macro neighbour cell, a unique network address of the base station supporting the macro-cell can be determined from the detection of a specific neighbour cell pilot signal. Accordingly, a handover to a target macro-cell may be initiated with an explicit and unique identification of the handover target base station.

In contrast, the access points (which in the specific example are base stations supporting pico-cells) use a pilot signal scrambling code which is shared between a plurality of access points within the reuse area and specifically a given neighbour list may comprise indications of shared pilot signal scrambling codes for a plurality of underlay cells that are all considered as neighbours/potential handover targets for the current cell. By sharing a pilot signal scrambling code between a plurality of access points, a significantly reduced number of scrambling codes are required by the system. Furthermore, by keeping the number of scrambling codes low, the number of scrambling codes that must be evaluated by the remote station for handover determination can be reduced substantially thereby reducing the measurement time, power consumption and/or complexity of the remote station.

However, the use of a shared pilot signal scrambling code means that the remote station (or supporting network nodes) cannot uniquely identify the access point which has been detected by the remote station simply from the detected scrambling code. Rather, a remote station detecting a scrambling code does not uniquely identify a given target access point for a handover but at best identifies only a group of access points which all use the same shared pilot signal scrambling code.

In some embodiments, all access points within a coverage area supported by a single macro-RNC may use the same scrambling code. However, it will be appreciated that in other embodiments, a plurality of shared scrambling codes may be available for the access points. Therefore, the access points may be divided into a number of groups with the access points of each group sharing a scrambling code but with different scrambling codes being used for different groups. In such embodiments, the scrambling codes may be allocated to the access points such that a reuse pattern is established with the interference between pico-cells having the same shared scrambling code being reduced or minimised.

In the specific example of FIG. 1, one macro-base station 101 which supports a macro-cell with a typical coverage area of 1-10 kilometers is illustrated. The macro base station 101 is coupled to a macro RNC 103 which is furthermore coupled to other macro base stations (not shown). The macro RNC 103 is furthermore coupled to a core network 105 which interfaces to other radio access networks and RNCs. In the example, the macro RNC 103 is coupled to a first MSC 107 which is further coupled to a second MSC 109 serving a different set of RNCs than the first MSC 107.

The system furthermore comprises a large number of pico-cell base stations/access points 111, 113 (for clarity only three access points are illustrated in FIG. 1). Each of the access points 111, 113 supports a pico-cell having a coverage area of typically 10 to 50 meters. The access points 111, 113 implement the required functionality of a UMTS base station in order to support UMTS communications within the pico-cell. However, in contrast to conventional UMTS base stations, the access points 109 use a common shared pilot signal scrambling code. In the system, the access points are residential access points intended to be located in individual subscriber's homes for supporting the subscriber(s) when at home. The access points therefore support one or more (but typically few) specific registered remote stations/subscribers and are only intended to serve the remote stations which are registered for the access point.

The system of FIG. 1 furthermore comprises an access point controller 115 which supports the access points 111, 113. In the specific example, the access point controller 115 specifically assists in routing data to and from the access points 111, 113 as well as assisting in providing handover target ambiguity resolution. In addition, the access point controller 115 may comprise a registration server for the access points 113. The registration server stores information of the identity of the remote stations that are registered with each of the access points 111, 113. In the example, the access points 111, 113 support subscribers in their home environment and a remote station is only allowed to handover to an access point 111, 113 if it is registered therewith.

The system of FIG. 1 furthermore comprises a remote station 117 which initially is served by the macro base station 101. The remote station 117 is supporting an active communication and is specifically making uplink transmissions to the first base station 101. The uplink scrambling code used by the remote station 117 is selected by a scrambling code controller 119 coupled to the macro RNC 103 (it will be appreciated that the scrambling code controller 119 may in many embodiments be implemented as part of the RNC).

The scrambling code controller 119 is arranged to select the uplink scrambling code used by the remote station 117. Specifically, the scrambling code controller 119 determines a set of allowable uplink scrambling codes from an identity of the first remote station 117. The set of uplink scrambling codes is uniquely determined from the identity so that if the identity of the remote station 117 is known, the set of possible uplink scrambling codes that can be used by the remote station 117 is also known. Thus, the set of uplink scrambling codes has a unique dependency from the identity. The scrambling code controller 119 then proceeds to select one uplink scrambling code from the set of possible uplink codes. It then communicates this to the remote station 117 to use for the uplink transmissions. Typically, the uplink scrambling code selection, communication and setup is performed as part of a call or data session setup.

Thus, the scrambling code controller 119 ensures that the uplink scrambling code used by the remote station 117 depends on the identity of the remote station 117 in a known way and with any uncertainty limited to which specific code out of the set of possible pilot signal scrambling codes is used. Accordingly, the set of potential uplink scrambling codes used by any remote station 117 at any given time will be known in the system and can be used by other network elements without requiring any dynamic exchange of information with any of the elements serving the remote station 117. For example, if the set of scrambling codes for the remote station 117 comprises two scrambling codes, the access points 111, 113 can independently determine that one of these two scrambling codes is used by the remote station.

In this way the uplink scrambling code utilised by any one remote station will always be one that is selected from a limited group of (a few) possible uplink codes. Specifically, the set of uplink scrambling codes may contain only one uplink scrambling code such that the uplink scrambling code used by the remote station 117 is always the same.

In the system of FIG. 1, the access points 111, 113 use the information of the uplink scrambling codes to perform a proximity detection of the remote station 117 and use this for handover of the remote station 117 as will be described later.

In the specific example, the identity of the remote station 117 which is used for determining the uplink scrambling code is the International Mobile Subscriber Identity (IMSI). However, it will be appreciated that other identities may be used in other embodiments including temporary identities such as a P-IMSI; T-IMSO etc.

As an example, the uplink scrambling code number selected for a given remote station may be determined as MSIN modulo $2^{24}$ where MSIN is the Mobile Station Identification Number for the remote station. In systems such as UMTS and GSM, the IMSI is typically 15 digits long with the first 6 digits typically taken up by the Mobile Country Code (MCC) and the Mobile Network Code (MNC). This leaves (typically) 9 digits for the MSIN.

In UMTS there are $2^{24}$=16.777216 million long uplink scrambling codes and the same number of short uplink scrambling codes (for each connection a choice is made between use of either a long or a short code).

The IMSI will typically be available to the macro RNC 103 (and thus the scrambling code controller 119) as it is included in the UMTS Information Element (IE) "Permanent NAS remote station identity" which is sent by the core network to the macro RNC 103 in a COMMON ID signalling message following establishment of an Iu signalling connection. The IMSI information is only sent if it is available to the core network. The information is often used by an RNC as part of the paging procedure.

If the IMSI is not available to the macro RNC 103/scrambling code controller 119, the system may use temporary identities such as P-TMSI or TMSI.

Figure 2:
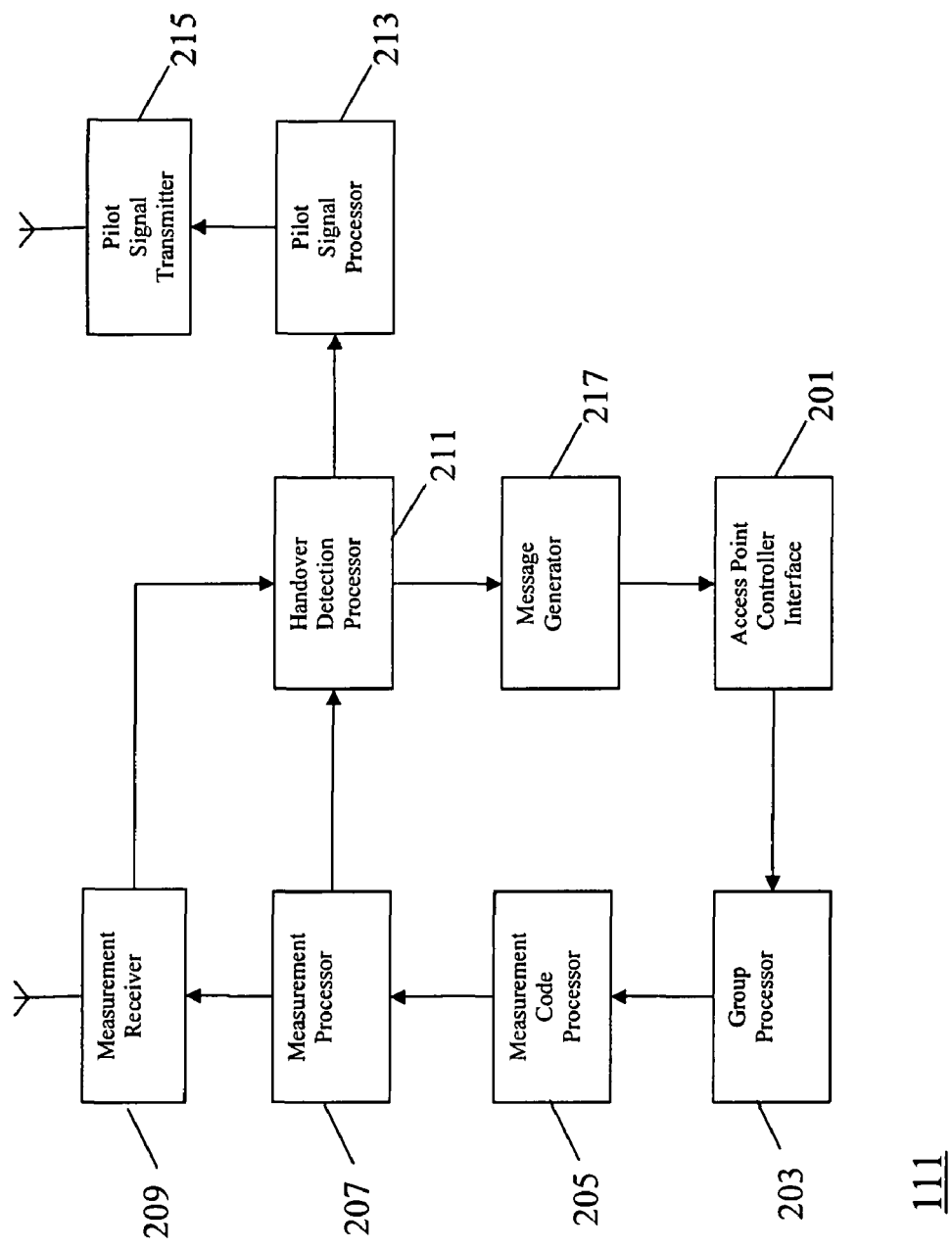
FIG. 2 illustrates an example of an access point in accordance with some embodiments of the invention.

FIG. 2 illustrates the first access point 111 in more detail. The other access points 113 are in the example identical to the first access point 111.

The access point 111 comprises an access point controller interface 201 which interfaces the access point 111 to the access point controller 115. The access point controller interface 201 is coupled to a group processor 203 which is arranged to determine a group of remote stations registered at the access point 111. In the specific example, the group processor 203 may receive a list of remote stations which are registered for the access point 111 from the access point controller 115. Thus, the registration server of the access point controller 115 stores information of the remote stations that are registered with each individual access point. Such information may e.g. be manually input by the network operator in response to subscription information for each remote station. The registration server may transmit a message to each access point 111, 113 with an indication of the remote stations which are registered for that access point 111, 113. In the example, the identification may be a subscriber identity such as the IMSI and/or may be the actual associated set of scrambling codes linked to the IMSI of each registered remote station. In the example, only remote stations which are registered with the (residential) access point may use the access point. Furthermore, in the example, the first remote station 117 is only registered with the first access point 111.

The group processor 203 is coupled to a measurement code processor 205 which is arranged to determine associated uplink scrambling codes for the group of remote stations identified by the group processor. Specifically, the measurement code processor 205 determines the sets of uplink scrambling codes which are associated/linked to the identity of the remote stations registered for the access point. Hence, the measurement code processor 205 determines at least the uplink scrambling code which is used by the first remote station 117.

In some embodiments, the group processor 203 receives the identity (e.g. IMSI) of the remote station(s) registered with the access point and the measurement code processor 205 uses this information to determine the set of possible uplink scrambling codes. Thus, the algorithm used by the scrambling code controller 115 to determine the set of uplink scrambling codes may be duplicated by the measurement code processor 205 in order to independently determine the possible uplink scrambling codes. In other embodiments, this functionality may be performed in the access point controller 115 and the group processor 203 may directly receive the scrambling codes (which may indirectly identify the remote stations). In such cases, the measurement code processor 205 may directly forward the information received from the group processor 203.

The measurement code processor 205 is coupled to a measurement processor 207 which is further coupled to a measurement receiver 209 that is arranged to determine a received signal level for a given scrambling code by de-correlating the received signal with the scrambling code as is known in the art. The measurement processor 207 controls the measurement receiver 209 to monitor for received signals that use the determined uplink scrambling codes.

Specifically, the measurement processor 207 may control the measurement receiver 209 to continuously and in parallel determine a received signal level for all possible uplink scrambling codes that may be used by the remote stations registered with the access point 111. However, as this number typically will be very low and as the number of uplink scrambling codes associated with each remote station can also be very low, the resource required for these measurements is typically low. Specifically, in many embodiments the number of monitored uplink scrambling codes may be a single code. In some embodiments, a plurality of scrambling codes may be monitored sequentially e.g. in periodically repeating time intervals.

It will be appreciated that the measurement receiver 209 may be arranged to scan for the uplink signal e.g. at different frequencies or with different time offsets in order to achieve synchronisation.

The measurement receiver 209 and measurement processor 207 are coupled to a handover detection processor 211 which is arranged to generate a potential handover detection for a handover of the first remote station from the first cell to the second cell in response to a detection of a received signal using the associated uplink scrambling code. Specifically, if the measured signal level for one of the monitored uplink scrambling codes increases above a predetermined threshold, the handover detection processor 211 generates a potential handover detection.

Thus, the generation of a potential handover detection is an indication that one of the remote stations registered with the access point is currently supported by another base station (typically the macro base station) but could probably be handed over to the access point. Accordingly, the access point may proceed to initiate a handover.

Thus, the described system provides a system wherein the potential for a handover of a remote station to its associated access point can be determined without the need for continuously transmitting a separate pilot signal from the access point. Furthermore, by linking uplink scrambling codes to the identity of the remote stations, the access points can automatically be configured to detect the uplink transmissions from the registered remote stations without requiring explicit information from the base station, the RNC or the core network elements currently supporting the remote station. Rather, an independent and autonomous configuration can be performed resulting in a reduced signalling overhead. Such an approach is not feasible in conventional systems wherein the uplink parameters required for monitoring for uplink transmissions from a remote station supported by other network elements are generally not available elsewhere in the system.

A particular advantage of the described system is that the potential handover detection is limited to remote stations which are registered with the access point and thus the number of initiated handover attempts is limited to the handovers that are relevant. For example, as a typical system could comprise 2-5 million access point users (and thus IMSIs), it is quite unlikely that a user close to another user's access point would be assigned the same uplink scrambling code.

In some embodiments, the access point 111 is arranged to initiate a handover attempt by temporarily transmitting a handover pilot signal with a specific handover pilot signal scrambling code. In the example of FIG. 2, the access point 111 comprises a pilot signal processor 213 which is coupled to a pilot signal transmitter 215. The pilot signal processor 213 controls the pilot signal transmitter 215 to transmit the handover pilot signal when the potential handover detection is generated by the handover detection processor 211. The handover pilot signal uses a pilot signal scrambling code which is included in the neighbour list for the remote station 117.

Furthermore, the pilot signal scrambling code is in the example a shared scrambling code which is used by a large number of access points 111, 113 underlying the macro cell. Thus, the same scrambling code can be used by a large number of access points thereby resulting in the neighbour list transmitted to the remote station only comprising a single entry for all these access points (in some embodiments only a single pilot signal scrambling code is used for all access points of one cell).

As the pilot signal scrambling code is included in the neighbour list, the handover pilot signal will be detected by the remote station 117 in the same way as any other pilot signal (assuming that the remote station 117 is sufficiently close to the access point 111 which will typically be the case when the uplink signal is detected by the access point 111 as this is effectively a proximity detection). Accordingly, the remote station 117 will proceed to generate a measurement report which is transmitted to the macro RNC 103 indicating that a handover to the base station transmitting the handover pilot signal is advantageous.

In response to receiving this measurement report, the macro RNC 103 initiates the handover procedure and specifically generates a RELOCATION REQUIRED message which is sent from the macro RNC 103 to the first MSC 107.

However, as the pilot signal scrambling code is shared between a large number of access points 111, 113, the macro RNC 103 does not know which exact access point 111, 113 has been detected by the remote station 117. In the specific example, this target ambiguity is resolved in the access point controller 115. Specifically, the pilot signal scrambling code is in the macro RNC 103 linked to the address of the access point controller 115 such that handover initiation in response to a detection of the specific pilot signal scrambling code will result in a RELOCATION REQUIRED message being addressed and sent to the access point controller 115. In the example, the pilot signal scrambling code is uniquely linked to the address of the access point controller 115 but it will be appreciated that in other embodiments more complex means for determining the address of a suitable access point controller may be used.

In the example, the access point 111 comprises a message generator 217 coupled to the handover detection processor 211 and the access point controller interface 201. When the potential handover detection is generated by the handover detection processor 211 this causes the message generator 217 to generate a handover indication message which is transmitted to the access point controller 215.

The handover indication message provides an access point identity indication of the access point which has transmitted the handover pilot signal i.e. of the first access point 117. In some embodiments, the access point identity indication may be implicit i.e. it may be provided simply by the source address for the message. Thus, the identity indication may be an indication of a network address of a network element serving the first access point 117 (including the first access point itself).

In addition, the handover indication message comprises an indication of the remote station 117 which was detected and resulted in the pilot signal being transmitted. The indication may for example be provided by an indication of the IMSI or the uplink scrambling code used by the remote station 117 or may be indicated implicitly e.g. by the source address for the message in cases where there is only one uplink scrambling code being monitored by the access point 111.

When the handover request message is received by the access point controller 115 the target access point address for the message is determined by comparing an identity indication for the remote station 117 with the identity indications for the remote stations which have recently been detected by any access point 111, 113 served by the access point controller 115. If a match is found, the handover request message is forwarded to that access point 111 or to an RNC supporting the identified target access point 111. In the example, the access points each comprise RNC functionality required for supporting the access point and specifically comprises the RNC handover functionality for the access point. Thus, the handover request message (e.g. the RELOCATION REQUIRED message) is forwarded directly to the identified target access point 111. The macro RNC 103 and the RNC functionality of the access point 111 may then proceed to perform a conventional handover process in order to hand over the remote station 117 to the access point 111.

It will be appreciated that in some embodiments, the target ambiguity resolution may be performed by the access point controller 115 without the access point transmitting a detection indication. For example, a remote station may only be linked to a single access point. Thus, if a handover request is received identifying a specific remote station, the access point controller 115 may access the registration server to identify the associated access point and the handover request message may be transmitted thereto.

However, such an approach may result in remote stations close to a non-associated access point which is currently transmitting a pilot signal (e.g. because it has detected another remote station registered with it) will report this pilot signal thereby starting a handover procedure which will be rejected at a later stage of the handover procedure. Such a handover message can be rejected immediately by the access point controller 115 if the first approach is used.

In some embodiments, the remote station may decode the unique cell identity transmitted by the access point (in UMTS this information is transmitted as data on the pilot signal). In this case, this information may be reported to the macro RNC and used to directly address the handover request message to the appropriate access point.

In some embodiments, the pilot signal transmitter may in addition to the temporary transmission of a handover pilot signal also transmit a cell selection pilot signal at least during time intervals wherein the handover pilot signal is not transmitted. The cell selection pilot signal uses a cell selection pilot signal scrambling code which is also included in the neighbour list for the remote station 117.

Whereas the handover pilot signal is transmitted to support a handover of a remote station in an active communication, the cell selection pilot signal are used for cell selection by remote stations which are not involved in any active user data communications i.e. for remote stations which are idle and/or not in a dedicated connected mode.

Thus, in the system the scrambling codes that are used for cell selection/re-selection of non-active remote stations are different to those that are used for the purposes of capturing remote stations for the purposes of handover.

For example scrambling codes a, b, c, d, e, f may be predefined for the purposes of handover (henceforth referred to as handover scrambling codes). A separate set of scrambling codes e.g. g, h, i, j, k, l are used for the purposes of cell selection/re-selection for non-active remote stations (henceforth referred to as cell selection scrambling codes).

In many embodiments, only one handover scrambling code is used. Specifically as the handover scrambling code only lights up temporarily when a remote station enters its associated access point cell, the created interference is marginal and is unlikely to require frequency planning or reuse of multiple scrambling codes.

Transmitting on two scrambling codes at the same time results in co-channel interference which may be acceptable in many embodiments, especially as the handover scrambling code is only used for a temporary interval whilst the remote station is being captured by the access point. However, in some embodiments, the interference may be reduced by the access point only transmitting the cell selection pilot signal when the handover pilot signal is not transmitted.

Thus, in order for the remote stations to be capable of selecting the access point cell when in idle mode, the access point broadcasts a cell selection pilot signal on an a priori defined cell selection scrambling code included in the neighbour list. However, in order to reduce the number of potential handovers to only remote stations registered with the access points, these scrambling codes are preferably not measured and reported when the remote station is in an active communication (e.g. when performing a DCH connected mode handover).

Accordingly, the remote station preferably has a handover neighbour list which comprises different neighbour lists (or equivalently different sections of the same list) for the handover of active communications and for cell selection when no communications are active. In this case, the handover pilot signal scrambling codes are only included in the handover neighbour list and the cell selection scrambling code is only included in the cell selection handover list.

UMTS does not provide for the explicit transmission of completely separate neighbour lists but does allow for this to be achieved by transmission of information indicating how different measurements should be performed. Specifically, UMTS allows different Measurement Control System Information (MCSI) to be sent for use in connected mode (SIB12) and in idle mode (SIB11).

Thus in the system at least two sets of scrambling codes are used with one set being used for cell (re)selection (transmission on these scrambling codes is preferably frequent/constant) whereas the other set is for handover purposes and are only transmitted when a registered remote station is detected to be proximal. The support of the two sets of scrambling codes is achieved by using separate sets for connected mode and idle mode (in this way idle mode users will not spend time searching for handover scrambling codes onto which they will not be able to re-select). The list of neighbour cells provided for users in connected mode includes the temporarily transmitted handover scrambling codes whereas the list of neighbour cells provided for users in idle mode includes the cell selection scrambling codes.

In some embodiments the system may be arranged to bias the remote stations away from reporting a detection of the cell selection pilot signal during an active communication by transmitting a receive level offset parameter for the cell selection pilot signal to the remote station. This offset parameter may only be applied when the remote station is in an active communication (e.g. connected mode).

Specifically, in UMTS, an active remote station may operate in a connected mode common channel state (e.g. Cell_FACH, Cell_PCH, URA_PCH). Remote stations in these states rely on cell re-selection in order to achieve mobility. However, as transmissions use different uplink scrambling codes (that are shared and therefore cannot be assigned based on the individual remote station identity), the proximity detection approach cannot be used and thus the presence of the temporary handover pilot signal cannot be used. Therefore, in this case, both the cell selection scrambling codes and the handover scrambling codes must be included in the connected mode neighbour list. In such embodiments, a receive level offset may be used to prevent the remote stations from reporting the cell selection scrambling codes for a dedicated channel active call while allowing them to be reported for a common (non-dedicated/shared resource) channel active call.

Specifically, the Cell Individual Offset parameter which is applied in determining when a measurement report is generated (ref Chapter 14 of the UMTS Technical Specifications 25.331) but is not used for the cell selection/re-selection procedures. Therefore, this parameter can be communicated to the remote station to discourage the generation of measurement reports on scrambling codes that have been set aside for cell selection purposes.

In some embodiments, the handover pilot signal may only be used during the initial phases of a handover and specifically may only be used to provide a pilot signal for the remote station 117 to detect whereas a different pilot signal may be used for the actual handover and for supporting the remote station when this is supported by the access point 111.

Specifically, in response to the RELOCATION REQUIRED message generated by the macro RNC 103, a handover radio configuration message comprising indications of various parameters and characteristics of a different pilot signal may be generated and transmitted to the remote station 117. The handover radio configuration message may specify characteristics and parameters for a cell selection pilot signal transmitted by the access point 111. The remote station 117 will then proceed to perform the handover using the cell selection pilot signal rather than the handover pilot signal. As a consequence, the time in which the handover pilot signal needs to be transmitted can be reduced further thereby reducing the interference to other access points and reducing the probability that other remote stations will detect the shared handover pilot signal scrambling code and generate handovers that will be rejected.

Specifically, when an SRNS (Serving Radio Network Subsystem) relocation (without Iur) procedure is performed in a UMTS system, the target RNC includes a Radio Resource Control (RRC) message (such as PHYSICAL CHANNEL CONFIGURATION, RADIO BEARER RECONFIGURATION) in a target RNC to Source RNC transparent container which is sent to the source RNC. The target RNC can use this message to inform the remote station of the configuration of the radio protocol layers (i.e. PHY, MAC, RLC layer, etc.) that should be used by the remote station under the target RNC. Specifically, the target RNC can indicate the scrambling code that should be used by the remote station under the target RNC. In this way it is possible to set the call up on a scrambling code of the targets system's choice. In the specific example, the access point controller 115 and/or the access point 111 can generate a transparent container with an indication of the pilot signal scrambling code used by the cell selection pilot signal and send this to the macro RNC 103. The macro RNC 103 forwards this to the remote station which then uses these parameters.

In the above example, the access point controller 115 comprises a registration server which transmits information to the access point 111 of which remote stations are registered with the access point 111, e.g. in the form of an IMSI or uplink scrambling code for each registered remote station. However, in other embodiments, the access point 111 can directly be provided with a user input of an identity of a registered remote station. For example, the access point 111 may comprise a keyboard input allowing a user (e.g. the subscriber or network operator) to directly type in e.g. the IMSI of a remote station registered with the access point. The access point 111 can then determine the associated uplink scrambling code(s) in response to the identity by applying the same algorithm as used by the scrambling code controller 119.

In the examples described above, the potential handover detection was used to initiate a handover by switching on the handover pilot signal resulting in the remote station 117 detecting the signal and generating a measurement report allowing the macro RNC 103 to initiate a handover. In other embodiments, the potential handover detection may result in a more direct handover initiation by the access point 111 or the access point controller 115.

Specifically, an access point 111 or an element serving an access point 111 (such as the access point controller 115 or an RNC serving the access point 111) can generate a handover initialisation message in response to the potential handover detection. The handover initialisation message is then, via the fixed network, transmitted to the macro RNC 103 which currently supports the remote station 117. The fixed network is the infrastructure part of the cellular communication system and generally includes the Core Network and any Radio Access Networks. In the specific example, the access point controller 115 can generate the handover initialisation message when the message indicating the potential handover detection is received from the access point 111. The message is then sent to the macro RNC 103 via the first and second MSCs 107, 109.

When the macro RNC 103 receives the handover initialisation message it proceeds to generate a handover request message for the first remote station to handover to the cell of the access point 111. Specifically, a RELOCATION REQUEST message can be generated and transmitted to the RNC serving the first access point 111. In the specific example, the access point 111 itself comprises the RNC functionality so the RELOCATION REQUEST message can be transmitted directly to the first access point 111.

Furthermore, as the handover is initialised by the first access point 111 when detecting the uplink transmission from the remote station 117, the exact target access point identity is known and can be included in the handover initialisation message. Thus, in the example, the handover initialisation message comprises the address of the first access point 111 and the macro RNC 103 can accordingly directly address the RELOCATION REQUEST message to the first access point 111.

Specifically, for a UMTS system the approach allows an SRNS relocation procedure to be triggered from the target side by sending a RANAP Relocation Required command to the first MSC 107. The RANAP Relocation Required command can comprise an RRC transparent container with additional information elements including e.g. the IMSI, uplink scrambling code or target cell identity. This can then prompt the macro RNC 103 to initiate a standard SRNS relocation.

In this example, the handover initialisation is based on detection of uplink transmissions from remote stations rather than on the detection of a downlink pilot signal. Accordingly, in such examples the access point may not transmit any handover pilot signal thereby reducing interference and the need for an additional pilot signal scrambling code.

In order to initiate the handover, the handover initiation message must be addressed to the correct macro RNC 103. In some embodiments, the access point controller 115 may receive an indication of a current location of the first remote station and use this to determine the address of the macro RNC 103 serving the access point. The current location is received from a network element supporting the first remote station in the first cell, such as the first MSC or a Home Location Register/Visitor Location Register (HLR/VLR). Specifically, the access point controller 115 can retrieve the current LAC (Location Area Code) for the remote station 117 from the HLR/VLR. As another example, it may be statically configured as the access point will typically only be accessible from the overlay macro cell.

As another example, a new message can be added in the relocation sequence to allow the macro RNC 103 to signal the presence of a user in the macro cell to the sublayer—e.g. Relocation Information.

Figure 3:
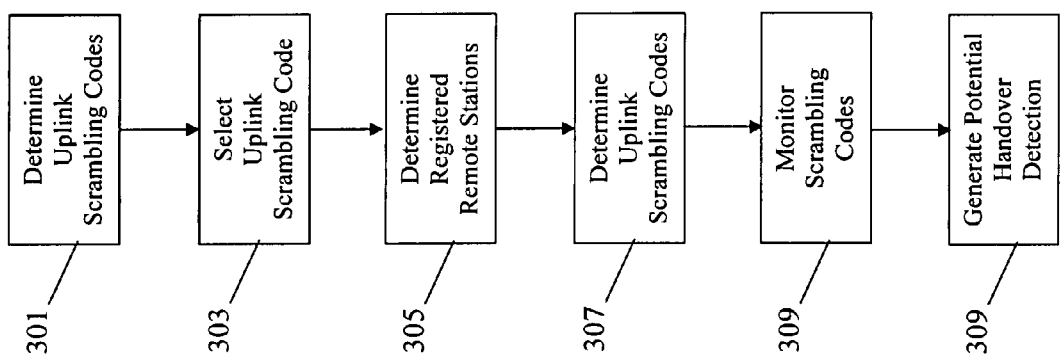
FIG. 3 illustrates a method of operation for a cellular communication system in accordance with some embodiments of the invention.

FIG. 3 illustrates a method of operation for a CDMA cellular communication system in accordance with some embodiments of the invention. The CDMA cellular communication system includes a first base station supporting a remote station making uplink transmissions using an uplink scrambling code in a first cell.

The method initiates in step 301 wherein a first set of uplink scrambling codes is determined from an identity for the first remote station.

Step 301 is followed by step 303 wherein the uplink scrambling code is selected from the first set. The first set has a unique dependency from the identity.

Step 303 is followed by step 305 wherein a first access point supporting a second cell determines a group of remote stations registered at the access point. The group of remote stations comprise the first remote station.

Step 305 is followed by step 307 wherein the first access point determines associated uplink scrambling codes for the group of remote stations. A first associated uplink scrambling code of the first remote station is a scrambling code of the first set of uplink scrambling codes;

Step 307 is followed by step 309 wherein the first access point monitors for received signals using the associated uplink scrambling codes.

Step 309 is followed by step 311 wherein the first access point generates a potential handover detection for a handover of the first remote station from the first cell to the second cell in response to a detection of a received signal using the first associated uplink scrambling code.

It will be appreciated that a handover or relocation of a remote station may be any process or activity wherein the remote station moves from being supported by one cell to being supported by another cell.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A Code Division Multiple Access, CDMA, cellular communication system comprising:
   a first base station supporting a remote station making uplink transmissions using an uplink scrambling code in a first cell;
   scrambling code means arranged to determine a first set of uplink scrambling codes from an identity of the first remote station and to select the uplink scrambling code from the first set, the first set having a unique dependency from the identity;
   a first access point supporting a second cell and comprising:
      means for determining a group of remote stations registered at the access point, the group of remote stations comprising the first remote station;
      means for determining associated uplink scrambling codes for the group of remote stations, a first associated uplink scrambling code of the first remote station being a scrambling code of the first set of uplink scrambling codes;
      means for monitoring for received signals using the associated uplink scrambling codes;
      handover detection means arranged to generate a potential handover detection for a handover of the first remote station from the first cell to the second cell in response to a detection of a received signal using the first associated uplink scrambling code; and
      handover means for temporarily transmitting a handover pilot signal using a handover pilot signal scrambling code in response to the potential handover detection, the pilot signal scrambling code being comprised in a neighbour list for the remote station.

2. The CDMA cellular communication system of claim 1 further comprising an access point controller arranged to support a plurality of access points including the first access point; and wherein the handover means is arranged to transmit a handover indication message to the access point controller in response to the potential handover detection, the handover indication message comprising an access point identity indication of the first access point.

3. The CDMA cellular communication system of claim 2 further comprising handover initiation means comprising:
   means for receiving a pilot detection message for the handover pilot signal from the remote station;
   means for determining an address of the access point controller in response to the pilot signal scrambling code;
   means for generating a handover request message; and
   means for transmitting the handover request message to the access point controller.

4. The CDMA cellular communication system of claim 3 wherein the access point controller is arranged to identify the first access point as a target handover access point for the handover request message in response to a remote station identity indication for the first remote station comprised in the handover request message and the access point identity indication.

5. The CDMA cellular communication system of claim 1 wherein the first access point further comprises means for transmitting a cell selection pilot signal at least during time intervals wherein the handover pilot signal is not transmitted, the cell selection pilot signal having a cell selection pilot signal scrambling code being comprised in a neighbour list for the remote station.

6. The CDMA cellular communication system of claim 5 wherein the first access point is arranged to not transmit the cell selection pilot signal when the handover pilot signal is transmitted.

7. The CDMA cellular communication system of claim 5 wherein the remote station comprises a handover neighbour list for handover of active communications and a cell selection neighbour list for cell selection when no communications are active; and
   the handover pilot signal scrambling code is comprised only in the handover neighbour list and the cell selection pilot signal scrambling code is comprised only in the cell selection handover list.

8. The CDMA cellular communication system of claim 5 further comprising means for biasing the first remote station away from reporting a detection of the cell selection pilot signal during an active communication by transmitting a receive level offset parameter for the cell selection pilot signal to the remote station; and the remote station is arranged to apply the receive level offset parameter to the cell selection pilot signal only when the remote station is involved in an active communication.

9. The CDMA cellular communication system of claim 1 further comprising means for transmitting a handover radio configuration message to the remote station, the radio configuration message comprising parameters for a second pilot signal;

and wherein the first access point comprises means for transmitting the second pilot signal; and wherein the remote station is arranged to hand over to the first cell using the second pilot signal.

10. The CDMA cellular communication system of claim 9 wherein the second pilot signal is a cell selection pilot signal supporting cell selection for non-active remote stations.

11. The CDMA cellular communication system of claim 1 wherein the access point comprises input means for receiving an indication of the identity of the first remote station and means for determining the first associated uplink scrambling code in response to the identity of the first remote station.

12. The CDMA cellular communication system of claim 1 further comprising handover initialisation means for generating a handover initialisation message in response to the potential handover detection; and means for communicating the handover initialisation message to a radio network controller supporting the first base station via a fixed network.

13. The CDMA cellular communication system of claim 12 wherein the radio network controller comprises means for generating a handover request message for the first remote station to handover to the second cell in response to receiving the handover initialisation message; and means for transmitting the handover request message to a radio network controller supporting the first access point.

14. The CDMA cellular communication system of claim 13 wherein the handover initialisation message comprises an identification of at least one of the first access point and the radio network controller supporting the first access point.

15. The CDMA cellular communication system of claim 12 wherein the handover initialisation means is arranged to determine an address of the radio network controller in response to receiving an indication of a current location of the first remote station from a network element supporting the first remote station in the first cell.

16. The CDMA cellular communication system of claim 12 wherein the access point is arranged to not transmit any handover pilot signal.

17. A method of operation for a Code Division Multiple Access, CDMA, cellular communication system including a first base station supporting a remote station making uplink transmissions using an uplink scrambling code in a first cell, the method comprising:

determining a first set of uplink scrambling codes from an identity of the first remote station;
selecting the uplink scrambling code from the first set, the first set having a unique dependency from the identity; and
a first access point supporting a second cell performing the steps of:
  determining a group of remote stations registered at the access point, the group of remote stations comprising the first remote station;
  determining associated uplink scrambling codes for the group of remote stations, a first associated uplink scrambling code of the first remote station being a scrambling code of the first set of uplink scrambling codes;
  monitoring for received signals using the associated uplink scrambling codes;
  generating a potential handover detection for a handover of the first remote station from the first cell to the second cell in response to a detection of a received signal using the first associated uplink scrambling code; and
  temporarily transmitting a handover pilot signal using a handover pilot signal scrambling code in response to the potential handover detection, the pilot signal scrambling code being comprised in a neighbour list for the remote station.

* * * * *